(12) United States Patent
Itikarlapalli et al.

(10) Patent No.: US 8,825,615 B2
(45) Date of Patent: Sep. 2, 2014

(54) SIMPLIFYING IMPLEMENTATION OF CUSTOM ATOMIC TRANSACTIONS IN A PROGRAMMING ENVIRONMENT

(75) Inventors: Krishna Mohan Itikarlapalli, Bangalore (IN); Sreekumar K. Seshadri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1347 days.

(21) Appl. No.: 10/709,522

(22) Filed: May 11, 2004

(65) Prior Publication Data

US 2006/0004882 A1    Jan. 5, 2006

(51) Int. Cl.
G06F 7/00    (2006.01)

(52) U.S. Cl.
USPC ............ 707/702; 707/607; 707/684; 718/100

(58) Field of Classification Search
USPC ........... 718/100; 707/201, 607, 684, 702, 703
See application file for complete search history.

(56) References Cited

U.S. PATENT DOCUMENTS

| | | | | |
|---|---|---|---|---|
| 5,701,480 A | * | 12/1997 | Raz | 718/101 |
| 5,781,910 A | * | 7/1998 | Gostanian et al. | 1/1 |
| 5,857,204 A | * | 1/1999 | Lordi et al. | 1/1 |
| 5,920,863 A | * | 7/1999 | McKeehan et al. | 707/10 |
| 6,799,188 B2 | * | 9/2004 | Weedon | 707/202 |
| 2002/0007363 A1 | * | 1/2002 | Vaitzblit | 707/202 |

OTHER PUBLICATIONS

"XA Components," Oracle8i JDBC Developer's Guide and Reference, 1999 <http://www.comp.hkbu.edu.hk/docs/o/oracle8i/java.816/a81354/xadistr2.htm>.*

Erol Gelenbe, "A model of roll-back recovery with multiple checkpoints", San Francisco, California, United States, pp. 251-255, Year of Publication:1976.

Silberschatz, A., "A Case for Non-Two-Phase Locking Protocols that Ensure Atomicity", Publication Date: Jul. 1983, vol. SE-9, Issue: 4, on pp. 535-538, ISSN:0098-5589.

Theo Haerder and Andreas Reuter, "Principles of transaction-oriented database recovery", Computing Surveys (CSUR) archive, vol. 15, Issue 4, Dec. 1983, pp. 287-317.

Shrivastava, S.K. and Waterworth, A., "Using objects and actions to provide fault tolerance in distributed, real-time applications" This paper appears in: Real-Time Systems Symposium, 1991, Proceedings. Twelfth, Publication Date: Dec. 4-6, 1991, on pp. 276-285.

C. Mohan, Don Haderle, Bruce Lindsay, Hamid Pirahesh and Peter Schwarz, "ARIES:A Transaction Recovery Method Supporting Fine-Granularity Locking and Partial Rollbacks Using Write-Ahead Logging", ACM Transactions on Database Systems (TODS), vol. 17, Issue 1,, Year of Publication: Mar. 1992, pp. 94-162.

(Continued)

*Primary Examiner* — Cheyne D Ly
(74) *Attorney, Agent, or Firm* — Narendra Reddy Thappeta

(57) ABSTRACT

An aspect of the present invention simplifies the implementation of custom atomic transactions. A program logic (implementing a custom atomic transaction) may request a unique transaction identifier from a programming environment. The program logic may then specify a task procedure, corresponding roll-back procedures, and the transaction identifier using an interface provided by the programming environment. The programming environment keeps track of the specified roll-back procedures. The information maintained by the programming environment may be used to execute the roll-back procedures if the atomic transaction is to be aborted. As the programming environment keeps track of the roll-back procedures to be executed, the implementation of atomic transactions may be simplified.

20 Claims, 7 Drawing Sheets

(56) References Cited

OTHER PUBLICATIONS

Mike Livesey and Colin Allison , "Operating System Level Support for Coherence in Distributed Systems", 5th workshop on ACM SIGOPS European workshop: Models and paradigms for distributed systems structuring , Year of Publication Sep. 1992, pp. 1-5.

Nodine, M.H and Zdonik, S.B, "Automating compensation in a multidatabase", This paper appears in: System Sciences, 1994. vol. II: Software Technology, Proceedings of the Twenty-Seventh Hawaii International Conference on , Publication Date: Jan. 4-7, 1994, vol. 2 , on pp. 293-302.

Robert Gruber, Frans Kaashoekt , Barbara Liskov and Liuba Shrira, This paper appears in: Mobile Computing Systems and Applications, 1994. WMCSA '08. First Workshop on, Publication Date: Dec. 8-9, 1994, on pp. 51-56.

\* cited by examiner

```
105:    Account1(){
110:        P1();
115:        Status = P2(Temp);
120:        if (Status==ERROR1){
125:            do-reverse-of-P2();
130:            do-reverse-of-P1();
135:            exit ();
138:        }
139:        temp-was-one=0;
140:        If (Temp==1){
145:            P3();
148:            P4();
150:            P5();
152:            temp-was-one=1;
153:        }
155:        Status=P6();
160:        if (status==ERROR2)  {
165:            do-reverse-of-P6();
170:            If (temp-was-one==1){
175:                do-reverse-of-P5();
178:                do-reverse-of-P4();
180:                do-reverse-of-P3();
183:            }
185:            do-reverse-of-P2();
190:            do-reverse-of-P1();
195:            exit ();
197:        }
199:    }
```

*FIG. 1*
*(Prior Art)*

```
205: Account1()
206: {
207:   Typedef int (*fptr)();
208:   Tstep(int, fptr, fptr);
209:   int txid = Tinit();

215:   Tstep (txid, P1(), R1());

225:   Status = Tstep (txid, P2(Temp), R2());
230:   if (Status == ERROR) {
240:     Tabort (txid);
245:     exit();
247:   }

250:   if (Temp==1) {
255:     Tstep (txid, P3(), R3());
260:     Tstep (txid, P4(), R4());
265:     Tstep (txid, P5(), R5());
267:   }

270:   Status = Tstep (txid, P6(), R6());
275:   if (Status == ERROR) {
280:     Tabort (txid);
285:     exit();
290:   }

295:   Tcommit (txid)
299: }
```

FIG. 2

| Transaction Id 402 | Task Procedure 403 | Roll-back Procedure 404 | Stack Status 405 |
|---|---|---|---|
| 200 | P1() | R1() | R1() |
| 200 | P2() | R2() | R2(), R1() |
| 300 | P1() | R1() | R1() |
| 300 | P2() | R2() | R2(), R1() |
| 300 | P3() | R3() | R3(), R2(), R1() |
| 300 | P4() | R4() | R4(), R3(), R2(), R1() |
| 300 | P5() | R5() | R5(), R4(), R3(), R2(), R1() |
| 200 | P6() | R6() | R6(), R2(), R1() |
| 300 | P6() | R6() | R6(), R5(), R4(), R3(), R2(), R1() |

SIMPLIFYING IMPLEMENTATION OF CUSTOM ATOMIC TRANSACTIONS IN A PROGRAMMING ENVIRONMENT

BACKGROUND OF INVENTION

1. Field of the Invention

The present invention relates to systems enabling software development, and more specifically to a method and apparatus for simplifying the implementation of custom atomic transactions in programming environments.

2. Related Art

An atomic transaction generally contains a set of tasks, which either together need to be completed or none executed. An example of an atomic transaction is transferring money electronically from bank account A to bank account B, in which a first task might involve debiting the money from A and a second task might involve crediting the money to B. As may be appreciated, it is generally required to complete both tasks or none executed.

In theory, it may be possible to implement an atomic transaction using entirely a hardware-based solution, in which the atomic transaction is executed potentially in a single clock cycle. such solutions are generally cost-prohibitive and also may not be usable for different types of atomic transactions.

Accordingly, typical data processing systems enable execution of tasks independently (either in sequence or with at least some level of parallelism), and a 'rollback' operation is performed with respect to the completed tasks (or portions thereof) if the atomic transaction is to be aborted in the middle. Rollback generally refers to restoring the state prior to executing the corresponding task. Thus, the general intended effect of rolling back the completed tasks is to restore to a state prior to the start of execution of the atomic operation.

Thus, in one prior approach, a programmer may have to design programs to keep track of the specific tasks that have completed, and rollback the completed tasks if an atomic transaction is to be aborted in the middle. Keeping track of the tasks adds to the complexity of design of the programs, and accordingly it is desirable to provide an improved approach to the manner in which atomic transactions are implemented in programming environments.

BRIEF DESCRIPTION OF DRAWINGS

The present invention will be described with reference to the accompanying drawings briefly described below.

FIG. 1 contains program logic for an example atomic transaction illustrating the problems associated with a prior approach.

FIG. 2 contains program logic for an example transaction illustrating the advantages of several aspects of the present invention

FIG. 4 is a table illustrating the details of entries maintained by a transaction manager for implementing rollback operations in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 3:
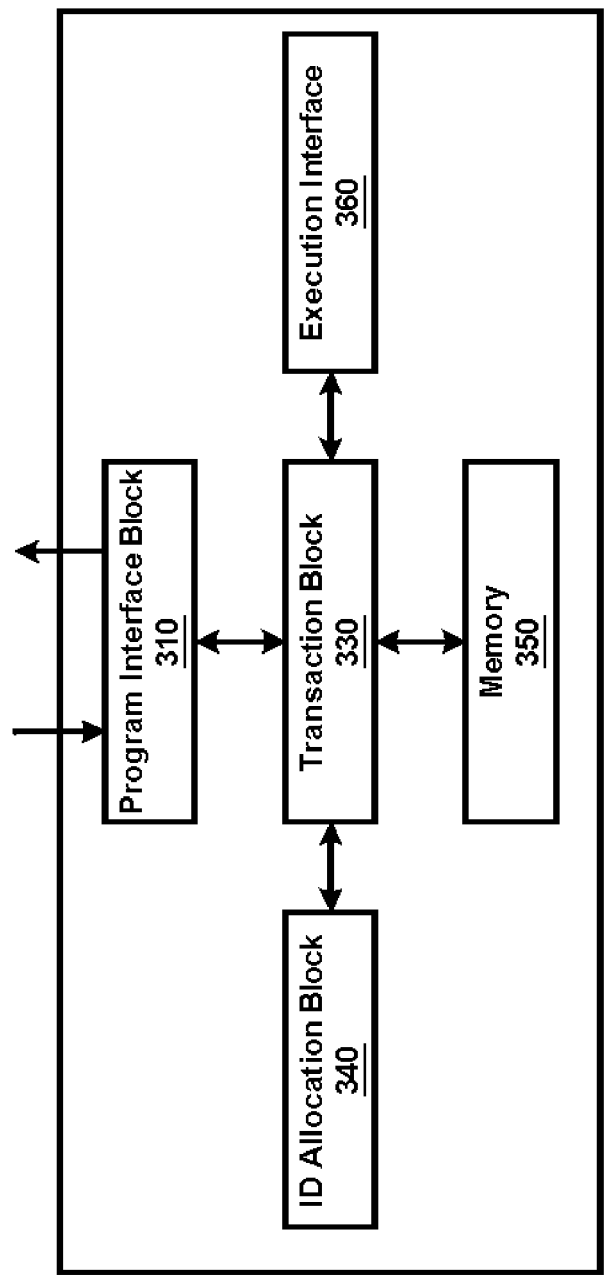
FIG. 3 is a block diagram of a transaction manager implemented according to an aspect of the present invention.

According to an aspect of the present invention, a programming environment provides a programmer the ability to request a unique transaction identifier associated with each desired atomic transaction. To execute a task procedure as a part of an atomic transaction, the programmer (program) may then specify a corresponding rollback procedure along with the transaction identifier. If an atomic transaction is to be aborted in the middle of execution (e.g., due to an error status returned by a task procedure), the program may simply need to specify the transaction identifier and the programming environment automatically executes the rollback procedures specified with the executed procedure tasks.

To support such features, the programming environment may keep track of the sequence in which the task procedures are executed for the atomic transaction (using the transaction identifier). The programming environment may automatically execute rollback procedures (in the reverse order) specified associated with all the completed task procedures.

As the programming environment keeps track of the sequence of task procedures executed associated with each atomic transaction, programmer (and the program logic) may be relieved of the challenge of keeping track of such detail. Accordingly, the implementation of atomic transactions may be simplified. In addition, as the programmer is provided the ability to specify custom rollback procedures associated with respective task procedures, greater control of implementing custom atomic transactions may also be provided.

Several aspects of the invention will be clearer by understanding the manner in which an example atomic transaction is implemented in a prior programming environment. Accordingly the description is continued with respect to an example in such a prior environment.

2. Atomic Transaction in Prior Programming Environment

FIG. 1 contains pseudo-code illustrating the manner in which an example atomic transaction is implemented in a prior approach. For ease of understanding, atomic transaction Account1( )(starting at line 105) is shown containing only few task procedures and desired rollback procedures. However, typical atomic transactions contain many task procedures. Account1( )is shown containing program logic in lines 110 through 190. Each line is described briefly below.

Line 110 is shown containing a call to task procedure P1( ). Line 115 is shown containing a call to task procedure P2( )and the status of execution of P2( ) is assigned to a variable status. The logic executed in P2( ) may set a variable Temp to a value depending on any consideration specified by the program logic (not shown).

In line 120, the variable status is compared with ERROR1 (either a variable set ahead, or a constant value defined elsewhere) to determine whether an error has occurred in the execution of P2( ). Control passes to line 125 if an error has occurred, to line 140 otherwise. Lines 125 (do-reverse-of-P2( )) and 130 (do-reverse-of-P1( )) respectively represent rollback procedures corresponding to P2( )and P1( ).

The occurrence of an error generally represents an example situation in which the atomic transaction is to be aborted. There may be other reasons (e.g., user intervention, higher level interrupt) due to which atomic transactions may need to be aborted.

Control exits the program logic in line 135 (assuming it is desirable to terminate execution upon occurrence of such an error situation). In line 139, a variable temp-was-one is set to 0, and this variable is changed to 1 in line 152 if control passes through lines 145-153. In line 140, the content of Temp is checked and if Temp equals 1task procedures P3( ), P4( ), and P5( ) are executed in lines 145, 148 and 150 respectively.

In line 155, a call to task procedure P6( ) is made and the status of execution is assigned to a variable status. In line 160, the variable status is compared with ERROR2 (which is similar to ERROR1, described above) to determine whether an error has occurred in the execution of P6( ). If an error has occurred, rollback procedure corresponding to task procedure P6( ) is executed as indicated in line 165.

In line 170, the content of temp-was-one is checked. If temp-was-one variable is equal to 1, it indicates that control has traversed via task procedures P3( ), P4( ) and P5( ) before reaching P6( ). Accordingly, the rollback procedures (do-reverse-of-P5( ); do-reverse-of-P4( ) do-reverse-of-P3( )) corresponding to task procedures P5( ), P4( ) and P3( ) are executed as indicated in lines 175, 178 and 180 respectively.

In lines 185 and 190, rollback procedures corresponding to task procedures P2( )and P1( ) are executed. In line 195, execution ends in line 195 by virtue of the exit( )statement. The logic for account1( )ends in line 199.

One problem with the above approach is that, a program may need to keep track of the control flow (or various lines of code traversed) prior to any situation in which an atomic transaction is to be aborted. The tracked control flow is used to execute the corresponding rollback procedures. In the illustrative example of FIG. 1, lines 139 and 152 (by using variable temp-was-one) are designed to keep track of whether control traversed lines 145-150, and rollback procedures of lines 178-183 are executed depending on whether control has traversed lines 145-150. The need to keep track of control adds to the program logic complexity, and may be undesirable particularly complex and lengthy programs.

Another problem with the above-described prior approach is that, code-duplication may be caused due to implementing rollback procedures corresponding to some task procedures at multiple places (in the entire code). In the above example, rollback procedures corresponding to task procedures P( ) and P2( )implemented in lines 125 and 130 may need to be duplicated in lines 185 and 190 as well. Such duplication generally leads to unstructured program designs, and could lead to higher implementation and maintenance costs.

The description is continued with respect to the manner in which various aspects of the present invention simplify the implementation of atomic transactions.aspects of the present invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the invention.

3. Example Implementation

FIG. 2 is shown containing a pseudo-code illustrating the manner in which atomic transactions may be implemented according to an aspect of the present invention. Broadly, four procedures (a group of instructions identified by a name and includes, without limitations, entities such as functions well known in the relevant arts) Tinit( ), Tstep( ), Tabort( ), and Tcommit( )are defined/employed to implement an atomic transaction according to an aspect of the present invention. First, the four procedures are described and then the program logic of FIG. 2 is described.

Tinit( )is a procedure which returns a transaction identifier when executed by a program. The transaction identifier may uniquely identify the corresponding instance of the atomic transaction. Tstep( )is a procedure which enables a user/programmer to specify a task procedure to be executed as a part of an atomic transaction, and a rollback procedure corresponding the task procedure.

Tabort( )is a procedure which executes the rollback procedures specified associated with the procedure tasks executed thus far in relation to an atomic transaction. Tabort( )may be executed if an atomic transaction is to be aborted in the middle. Tabort( ) may accept a transaction identifier corresponding to the atomic transaction as a parameter.

Tcommit( )is a procedure which binds the task procedures (executed prior to Tcommit( )) of an atomic transaction, and generally implies successful execution of an atomic transaction. The pseudo-code of FIG. 2 illustrates the manner in which the atomic transaction of FIG. 1 can be implemented using the procedures thus provided in an embodiment of the present invention.

Lines 207 through 209 are respectively shown containing declarations Typedef int (*fptr)( ); (fptr is a pointer type variable, declared as an integer), Tstep(int, fptr, fptr) (accepts three parameters respectively of type integer, pointer, and a pointer), and int txid=Tinit( ) (Tinit( ) returns a transaction identifier which is assigned to an integer type variable txid).

Line 215 is shown containing procedure call Tstep(txid, P1( ), R1( )). The procedure call specifies that P1( ) is a task procedure and R1( ) is the corresponding rollback procedure. The variable txid specifies that the task procedure P1( ) is to be executed as a part of an atomic transaction uniquely identified by txid. Thus, the procedure calls in the user program of FIG. 2 contains two separate procedures, P1( ) and R1( ). All the Tstep procedure calls of FIG. 2 specify Txid, and the corresponding description is not repeated below in the interest of conciseness.

Line 225 is shown procedure call Tstep (txid, P2(Temp), R2( )), and the value returned by the procedure call is assigned to a variable status. The procedure call is described similar to line 215 above, except that task procedure P2( )accepts Temp as a parameter.

Line 230 determines if the execution of line 225 returned an error (by checking whether the variable contains a value equaling ERROR1). If an error is encountered (i.e., a situation requiring aborting of the atomic transaction), Tabort( ) of line 240 is executed to rollback the procedures executed for the atomic transaction specified by txid.

By comparing with lines 125 and 130, it may be appreciated that the programmer need not specify that P1( ) and P2( ) are the procedure tasks to he rolled back at this specific error instance, which simplifies the programming task. Execution of the program logic may be terminated due to the exit statement in 245 (assuming it is desirable to exit in such an error situation).

Line 250 checks whether the variable Temp equals 1. Control pass to line 255 if the condition is true, and to line 270 otherwise. Lines 255, 260, and 265 respectively execute task procedures P3( ), P4( ) and P5( ), with each line specifying the corresponding rollback procedure.

Line 270 contains a Tstep procedure, which executes task procedure P6( ) having an associated rollback procedure specified as R6( ). The result of execution of P6( ) is assigned to Status (a variable). In line 275, the content of Status is checked and on occurrence of error (by comparison with ERROR2), control passes to step 280, to step 295 otherwise.

Line 280 contains procedure call Tabort( )indicating that rollback is to be performed for all the task procedures executed thus far associated with the atomic transaction.

It may be appreciated that line 280, in effect, may perform the program logic corresponding to lines 165-190 of FIG. 1. Thus, in comparison to a programmer writing the program logic corresponding to FIG. 1, a programmer writing the program logic of FIG. 2 need not keep track of prior control flow. In addition, the repetition of coding (e.g., lines 130 and 135 repeated in lines 190 and 195 of FIG. 1) is also avoided, leading to potentially fewer errors and less maintenance overhead.

To support the features such as above, the programming environment needs to be implemented to support programming logic such as that noted above. The description is continued with reference to an embodiment of a programming environment (referred to as a transaction manager) operating to support such programming logic.

4. Transaction Manager

FIG. 3 is a block diagram of a transaction manager implemented according to an aspect of the present invention. Transaction manager is shown containing program interface block 310, transaction management block 330, ID allocation block 340, memory 350, execution interface 360, and roll-back block 380. For illustration, the description is provided with reference to FIG. 2. However, various aspects of the present invention may be implemented using other types of interfaces as well. Each block is described in detail below.

Program interface block 310 may provide an interface using which programs may interact with the transaction manager to execute atomic transactions according to various aspects of the present invention. Program interface block 310 may receive appropriate data in response to execution of procedure calls (four, in the illustrative example described above), and forwards the received data to transaction management block 330. In case of transactions such as Tinit( ), the transaction identifier is passed back to the execution environment (which executes software instructions).

ID allocation block 340 generates an unique identifier for each transaction in response to a Tinit( )procedure described above. An unique transaction identifier corresponding to each transaction may be generated, for example, using one of several known approaches.

Execution interface 360 interfaces with an execution environment (provided to execute software instructions) to cause execution of various task procedures and rollback procedures. The task procedures are generally executed in response to the Tstep( )procedure calls described above, and the rollback procedures are executed in response to Tabort( ) procedure calls. The specific rollback procedures to be executed may be indicated by stack memory 350, as described in sections below.

Transaction management block 330 coordinates various operations that may need to be performed in implementing atomic transactions according to various aspects of the present invention. For example, transaction management block 330 may store in memory 350 a transaction identifier generated (by ID allocation block 340) for each atomic transaction. In addition, the rollback procedures specified with the executed Tstep( )procedure call may also be stored in memory.

Transaction management block 330 may interface with execution interface 360 execute the rollback procedures stored (in memory 350) associated with an atomic transaction in response to a Tabort( )procedure call. In addition, transaction management block 330 may remove from memory 350 all the entries corresponding to an atomic transaction if Tcommit( ) or exit( ) procedure calls are executed.

The description is continued with respect to an example approach to organizing the data in memory 350, which supports various features described above. The approach uses a stack (last-in-first-out LIFO) format to organize the data, and accordingly is described below as a stack memory.

5. Stack Memory

FIG. 4 is a table illustrating the manner in which a transaction manager may store various entries to implement rollback operations to be performed in one embodiment. For illustration, entries in stack table 400 are shown corresponding to illustrative example in which the program logic of FIG. 2 is executed twice in parallel, and two instances of the atomic transactions (two atomic transactions, in general) are executed in parallel. The atomic transactions are assumed to have been assigned unique identifiers of 200 and 300 respectively.

Table 400 is shown containing four columns 402, 403, 404 and 405, and nine rows 411-419. Columns 402 through 404 respectively represent transaction ID (txid), task procedure and rollback procedure specified by a corresponding Tstep( )procedure call, and column 405 indicates the stack status on execution of the corresponding Tstep( )procedure call. The seven rows correspond to execution of the corresponding seven Tstep( ) procedure calls. Each row is described below in further detail.

Row 411 indicates the stack status corresponding to atomic transaction with an identifier of 200 equals {R1( )}, which represents the status on execution of line 215 by the first atomic transaction. Line 412 indicates that the stack status corresponding to atomic transaction with an identifier of 200 equals {R2( ), R1( )}, which represents the status on execution of line 225 by the first atomic transaction. The stack status corresponding to the second atomic transaction (with identifier 300) is shown built similarly in rows 413 and 414 respectively.

It is assumed that the value of temp is set to 0 in the execution of the first atomic transaction and to 1 in the execution of the second atomic transaction. As a result, lines 255, 260 and 265 (containing task procedures of P3( ), P4( ), and P5( ) respectively) of FIG. 2 are executed only in the case of the second atomic transaction.

The stack status for the second atomic transaction on the execution of lines 255, 260 and 265 are shown in lines 415, 416 and 417 respectively.lines 415, 416 and 417 indicate a stack status of {R3( ), R2( ), R1( )} {R4( ), R3( ), R2( ), R1( )} {R5( ), R4( ), R3( ), R2( ), R1( )} respectively for the second atomic transaction.

Lines 418 and 419 respectively indicate the status of the stack for the two atomic transactions on corresponding execution of line 270 (containing task procedure P6( ) with corresponding rollback procedure of R6( )). Thus, R6( ) is shown added to the top of the stack for each of the atomic procedures in lines 418 and 419 respectively.

By observing the stack entries, it may be appreciated that execution/support of Tabort( ) merely requires executing the rollback procedures in the stack entry of the corresponding atomic transaction. For example, execution of line 280 of FIG. 2 for the first atomic transaction would require execution of R6( ), R2( )and R1( )only, whereas for the second atomic transaction would require execution of R6( ), R5( ), R4( ), R3( ), R2( ) and R1( )in that order.

Thus, using approaches such as those described above, a transaction manager may enable easy termination of atomic transactions. The description is continued with reference to the manner in which programs may be designed according to various aspects of the present invention.

6. User Programs

Figure 5:
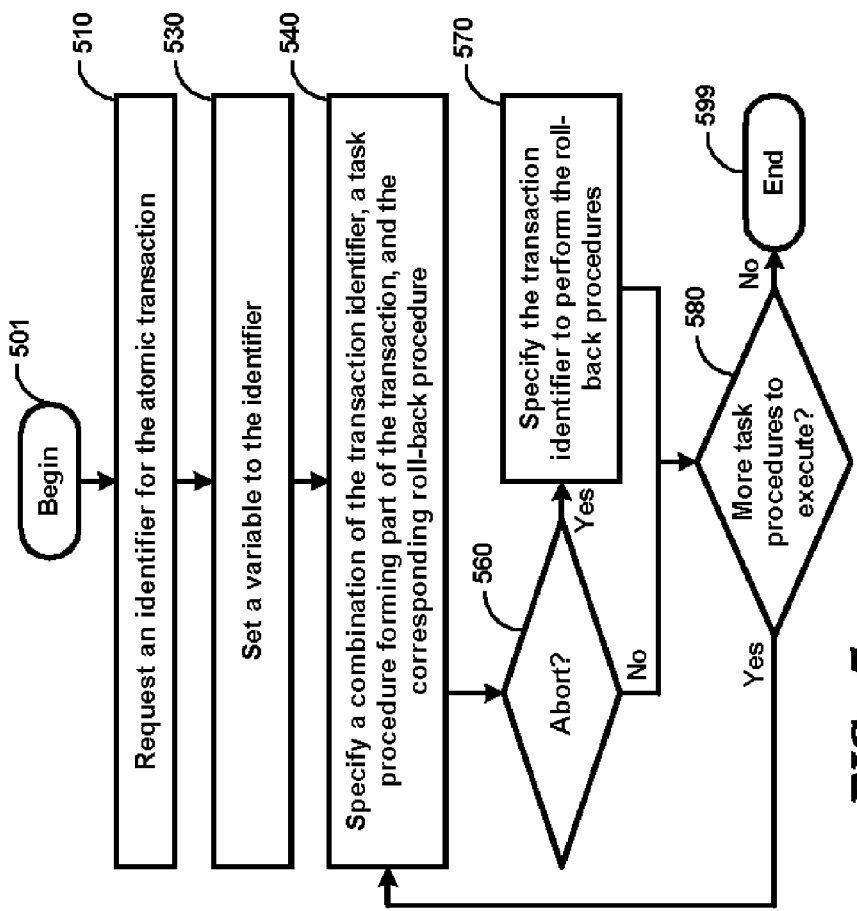
FIG. 5 is a flow-chart illustrating the manner in which an user program may implement atomic transactions according to several aspects of the present invention.

FIG. 5 is a flow-chart illustrating the manner in which a user program may implement custom atomic transactions according to an aspect of the present invention. For illustration, the method is described with reference to FIGS. 2 and 3. The method begins in step 501 in which control immediately passes to step 510.

In step 510, the user program requests an identifier for the atomic transaction. Procedure calls such as Tinit( ) described above may be used to request the identifier. In step 530, the user program sets a variable to the identifier.

In step 540, the user program specifies a combination of the transaction identifier, a task procedure, and a corresponding rollback procedure. The task procedure contains the program logic implementing at least a portion of the atomic transaction sought to be implemented, and the roll-back procedure may contain the program logic to un-do the actions performed by the task procedure. Even though the example above are shown specifying the combination in the form of a single line of code (procedure call), multiple lines can be used in alternative embodiments.

In step 560, the user program determines whether to abort an atomic transaction. Even though the determination is described as being synchronous, it should be understood that the requirements to abort may occur asynchronously as well (e.g., interrupt caused prior to an expected power down). Control passes to step 570 if it is determined to rollback, and to step 580 otherwise.

In step 570, the user program specifies the transaction identifier of the atomic transaction to be rolled back. Approaches such as those described above may be used to perform the roll back operation. In step 580, control passes to step 540 if more task procedures need to be executed, to step 599 otherwise. The method ends in step 599.

A programmer may thus define custom atomic transactions using the approaches described above. The description is continued with reference to the manner in which a transaction manager may support user programs.

7. Method in Transaction Manager

Figure 6:
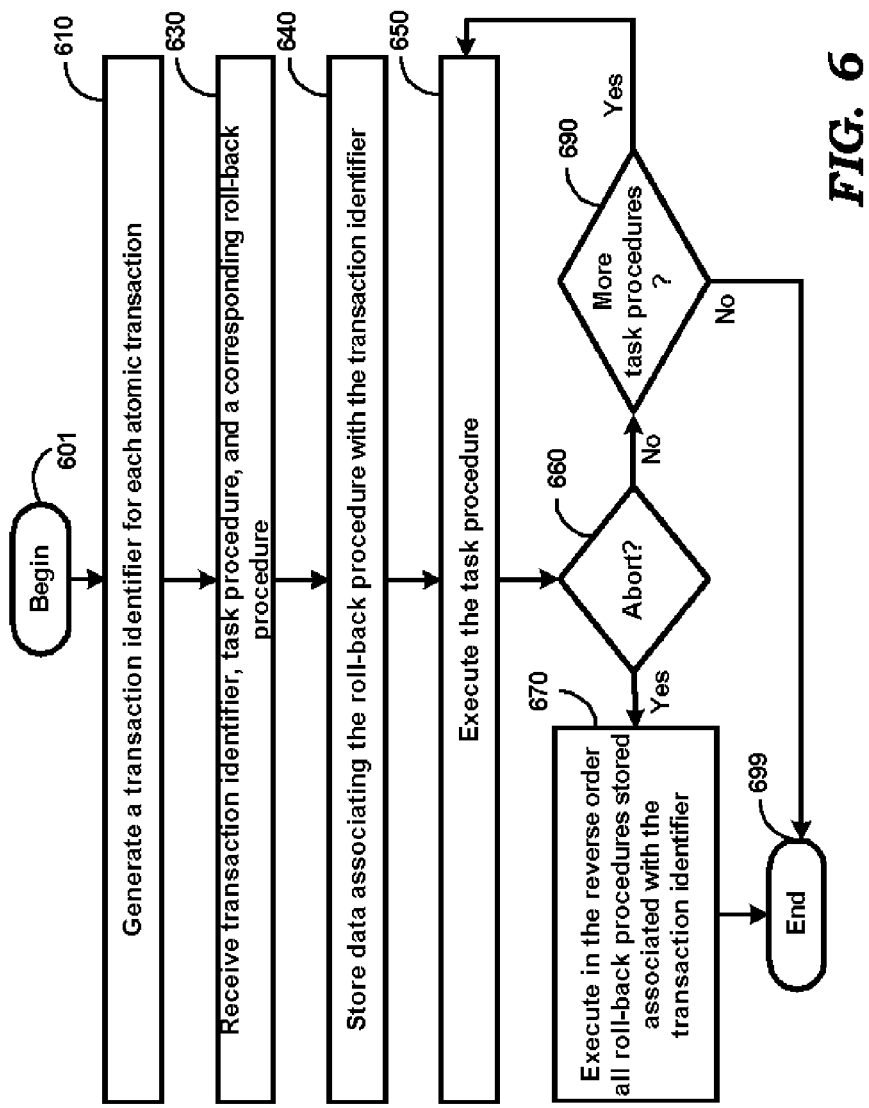
FIG. 6 is a flow-chart illustrating the manner in which a transaction manager implements rollback operations in one embodiment.

FIG. 6 is a flow-chart illustrating the manner in which embodiments of a transaction manager may operate according to an aspect of the present invention. For illustration, the description is provided with reference to FIGS. 2, 3, 4, and 5. The method begins in step 601 in which control immediately passes to step 610.

In step 610, a transaction identifier that is unique to each atomic transaction may be generated in response to statements such as Tinit( ) described above. In step 630, a combination of the transaction identifier, task procedure, and a corresponding rollback procedure specified by a user program, may be received.

In step 640, data associating the rollback procedure with the atomic transaction may be stored. Approaches such as those described with reference to stack memory 350 may be used to store the data. In step 650, the task procedure specified in step 630 may be executed.

In step 660, a determination is made as to whether to abort the atomic transaction, for example, based on program code implementing the atomic transaction. Control passes to step 670 if the rollback needs to be performed, and to step 690 otherwise.

In step 670, the rollback procedures are executed in the reverse order in relation to the order of execution of the respective task procedures. Control then passes to step 699.

In step 690, a determination is made as to whether more task procedures (forming part of the atomic transaction) are to be executed. Control passes to step 650 if more task procedures need to be executed, to step 699 otherwise. The method ends in step 699.

The transaction manager thus operates to implement various aspects of the present invention described above. The description is continued with respect to the manner in which digital processing systems may be implemented substantially in the form of software to support several aspects of the present invention.

8. Software Implementation

Figure 7:
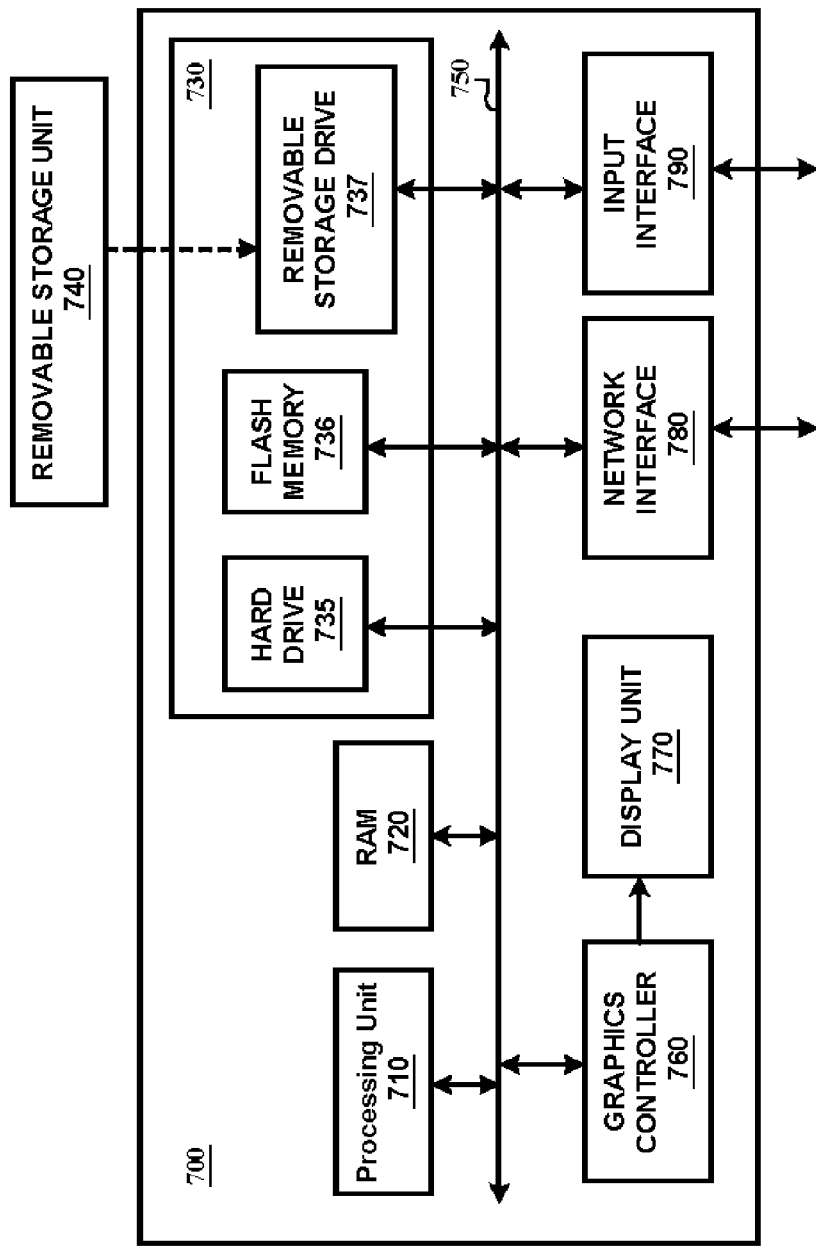
FIG. 7 is a block diagram illustrating the manner in which several aspects of the present invention may be implemented substantially in the form of software instructions in one embodiment.

FIG. 7 is a block diagram illustrating the details of computer system 700 implemented substantially in the form of software in an embodiment of the present invention. Merely for conciseness, it is assumed that the transaction manager and the execution environment (which executes programs such as those in FIG. 2 otherwise) are implemented in a single computer system 700. However, transaction manager and execution may be implemented in different systems as well, without departing from the scope and spirit of various aspects of the present invention.

Computer system 700 may contain one or more processors such as processing unit 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

Processing unit 710 may execute instructions stored in RAM 720 to provide several features of the present invention. Processing unit 710 may contain multiple processors, with each processor potentially being designed for a specific task. Alternatively, processing unit 710 may contain only a single processor. RAM 720 may receive instructions and data from secondary memory 730 and network interface 780 using communication path 750.

Graphics controller 760 generates display signals (e.g., in RGB format) to display unit 770 based on data/instructions received from processing unit 710. Display unit 770 contains a display screen to display the images defined by the display signals. Input interface 790 may correspond to a key_board and/or mouse, and generally enables a user to provide various inputs (e.g., write a program implementing an atomic transaction). Network interface 780 enables some of the inputs (and outputs) to be provided on a network. Display unit 770, input interface 790 and network interface 780 may be implemented in a known way.

Secondary memory 730 may contain hard drive 735, flash memory 736 and removable storage drive 737. Secondary memory 230 may store the data (e.g., transaction identifier, task procedure and rollback procedure etc) and software instructions which cause computer system 700 to provide several features in accordance with the present invention. Some or all of the data and instructions may be provided on removable storage unit 740, and the data and instructions may be read and provided by removable storage drive 737 to processing unit 710. Floppy drive, magnetic tape drive, CD_ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to computer system 700. Processing unit 710 may retrieve the software instructions, and execute the instructions to provide various features of the present invention as described above.

Thus, a programmer/user may be provided flexibility to define custom atomic transactions according to various aspects of the present invention.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A method of implementing atomic transactions in a system, said method comprising:
    requesting in a user program a transaction identifier for an atomic transaction;
    generating said transaction identifier in a transaction manager in response to said requesting;
    specifying in said user program a plurality of combinations, wherein each of said plurality of combinations contains said transaction identifier, a task procedure, and a rollback procedure,
    wherein each combination indicates that the rollback procedure is to be executed if the execution of the corresponding task procedure in the combination is completed and if said atomic transaction is to be aborted,
    wherein said task procedure implements a part of said atomic transaction and said rollback procedure is designed to rollback said task procedure;
    executing a set of task procedures in a sequential order according to said user program, wherein said set of task procedures are contained in said task procedures specified in said plurality of combinations;
    keeping track of a set of rollback procedures corresponding to said set of task procedures, each of said set of rollback procedures being determined based on a combination corresponding to an executed task procedure contained in said set of task procedures, said combination being contained in said plurality of combinations specified in said user program, wherein said set of rollback procedures are kept track of external to said user program in response to said executing of the corresponding task procedures; and
    executing said set of rollback procedures in a reverse order of said sequential order if said atomic transaction is to be aborted,
    wherein said rollback procedure is specified as a separate procedure from said task procedure in said user program,
    wherein said user program contains groups of instructions to implement respective program logic for each of said task procedure and said rollback procedure, and
    whereby each user program has corresponding custom logic specified by a user for each of the rollback procedures.

2. The method of claim 1, wherein said transaction identifier is unique to each of the atomic transactions.

3. The method of claim 1, wherein said keeping comprises storing data representing said rollback procedures in a stack.

4. The method of claim 3, wherein said stack is stored in a memory.

5. The method of claim 1, wherein said user program further comprises additional instruction for examining a status returned by execution of one of said task procedures and performing said aborting if said status indicates an error,
    wherein said aborting is specified in said user program using an instruction containing said transaction identifier.

6. The method of claim 1, wherein said aborting is performed asynchronously.

7. A non-transitory computer readable storage medium carrying one or more sequences of instructions representing a user program for execution on a system, said user program implementing an atomic transaction, wherein execution of said one or more sequences of instructions by one or more processors contained in said system causes said system to perform the actions of:
    requesting an identifier in said user program from a transaction manager for said atomic transaction, said transaction manager being provided external to said user program, wherein said transaction manager generates a unique value as said identifier and provides said identifier to said user program;
    setting a variable to equal said identifier in said user program;
    specifying a plurality of combinations in said user program for execution in said system, wherein each of said plurality of combinations contains said variable, a task procedure, and a rollback procedure,
    wherein each combination indicates in said user program that the rollback procedure is to be executed if the execution of the corresponding task procedure in the combination is completed and if said atomic transaction is to be aborted,
    wherein said task procedure implements a part of said atomic transaction and said rollback procedure is designed to rollback said task procedure, wherein said variable in each of said plurality of combinations specifies said identifier generated by said transaction manager;
    executing a set of task procedures in a sequential order, wherein said set of task procedures are contained in said task procedures specified in said plurality of combinations; and
    aborting said atomic transaction by specifying, in said user program, said identifier associated with an abort procedure to cause a set of rollback procedures to be executed in a reverse order of said sequential order, each of said set of rollback procedures being determined based on a combination corresponding to an executed task procedure contained in said set of task procedures,
    wherein said plurality of combinations and said abort procedure are contained in said user program,
    wherein said user program contains groups of instructions to implement respective program logic for each of said task procedure and said rollback procedure, and whereby each user program has corresponding custom logic specified by a user for each of the rollback procedures.

8. The computer readable storage medium of claim 7, wherein said specifying comprises including each of said plurality of combinations in a single procedure call.

9. The computer readable storage medium of claim 7, further comprising examining a status returned by execution of one of said task procedures and performing said aborting if said status indicates an error.

10. A non-transitory computer readable storage medium carrying one or more sequences of instructions for supporting implementation of a transaction manager which supports an atomic transaction in a user program executing in a system, wherein execution of said one or more sequences of instructions by one or more processors contained in said system causes said system to perform the actions of:
generating an identifier for said atomic transaction for said user program;
providing said identifier to said user program;
receiving a plurality of combinations for execution from said user program, wherein each of said plurality of combinations contains said transaction identifier, a task procedure, and a rollback procedure,
wherein each combination indicates that the rollback procedure is to be executed if the execution of the corresponding task procedure in the combination is completed and if said atomic transaction is to be aborted,
wherein said task procedure implements a part of said atomic transaction and said rollback procedure is designed to rollback said task procedure;
executing a set of task procedures in a sequential order according to said user program, wherein said set of task procedures are contained in said task procedures specified in said plurality of combinations;
keeping track of a set of rollback procedures corresponding to said set of task procedures, each of said set of rollback procedures being determined based on a combination corresponding to an executed task procedure contained in said set of task procedures, said combination being contained in said plurality of combinations specified in said user program; and
executing said set of rollback procedures in a reverse order of said sequential order in response to receiving an abort request, said abort request being received from said user program and containing said identifier,
wherein said rollback procedure is specified as a separate procedure from said task procedure in said user program,
wherein said user program contains groups of instructions to implement respective program logic for each of said task procedure and said rollback procedure, and
whereby each user program has corresponding custom logic specified by a user for each of the rollback procedures,
wherein said transaction manager is provided external to user programs including said user program.

11. The computer readable storage medium of claim 10, wherein said transaction identifier is generated to be unique for each atomic transaction.

12. The computer readable storage medium of claim 10, wherein said set of rollback procedures are represented in the form of a stack.

13. The computer readable storage medium of claim 12, wherein said stack is stored in a memory.

14. A computer system comprising:
a memory storing a plurality of instructions; and
a processing unit coupled to said memory and executing said plurality of instructions;
a computer readable medium to store and provide said plurality of instructions to said memory, wherein execution of said plurality of instructions by said processing unit causes said computer system to support implementation of atomic transactions in a programming environment by performing the actions of:
request in a user program, a transaction identifier for an atomic transaction;
generate said transaction identifier in a transaction manager in response to said requesting, wherein said transaction manager is provided external to said user program;
specify in said user program a plurality of combinations wherein each of said plurality of combinations contains said transaction identifier, a task procedure, and a rollback procedure,
wherein each combination indicates in said user program that the rollback procedure is to be executed if the execution of the corresponding task procedure in the combination is completed and if said atomic transaction is to be aborted,
wherein said task procedure implements a part of said atomic transaction and said rollback procedure is designed to rollback said task procedure, wherein said rollback procedure is specified as a separate procedure from said task procedure;
execute a set of task procedures in a sequential order according to said user program, wherein said set of task procedures are contained in said task procedures specified in said plurality of combinations;
keep track of a set of rollback procedures corresponding to said set of task procedures, each of said set of rollback procedures being determined based on a combination corresponding to an executed task procedure contained in said set of task procedures, said combination being contained in said plurality of combinations specified in said user program, wherein said set of rollback procedures are kept track of external to said user program in response to said executing of the corresponding task procedures; and
execute said set of rollback procedures in a reverse order of said sequential order if said atomic transaction is to be aborted, wherein said rollback procedures are identified according to said keeping,
wherein said user program contains groups of instructions to implement respective program logic for each of said task procedure and said rollback procedure, and
whereby each user program has corresponding custom logic specified by a user for each of the rollback procedures.

15. The computer system of claim 14, wherein said transaction identifier is unique to each of the atomic transactions.

16. The computer system of claim 14, wherein the actions performed by said computer system further comprise store data representing said rollback procedures in a stack to perform said keep.

17. The computer system of claim 16, wherein said stack is stored in a memory.

18. The computer system of claim 14, wherein the actions performed by said computer system further comprise examine a status returned by execution of one of said task procedures and to perform said aborting if said status indicates an error.

19. The computer system of claim 14, wherein the actions performed by said computer system further comprise execute said rollback procedures asynchronously.

20. The computer readable storage medium of claim 7, wherein said rollback procedure is specified as a separate procedure from said task procedure in said user program.

* * * * *

UNITED STATES PATENT AND TRADEMARK OFFICE
CERTIFICATE OF CORRECTION

| | | |
|---|---|---|
| PATENT NO. | : 8,825,615 B2 | Page 1 of 1 |
| APPLICATION NO. | : 10/709522 | |
| DATED | : September 2, 2014 | |
| INVENTOR(S) | : Itikarlapalli et al. | |

It is certified that error appears in the above-identified patent and that said Letters Patent is hereby corrected as shown below:

On title page, column 2, under Abstract, line 6, delete "roll-back" and insert -- rollback --, therefor.

On title page, column 2, under Abstract, line 8-9, delete "roll-back" and insert -- rollback --, therefor.

On title page, column 2, under Abstract, line 10, delete "roll-back" and insert -- rollback --, therefor.

On title page, column 2, under Abstract, line 12, delete "roll-back" and insert -- rollback --, therefor.

In the Specification

In column 1, line 56, delete "invention" and insert -- invention. --, therefor.

In column 3, line 54, delete "transactions.aspects" and insert -- transactions. Aspects --, therefor.

In column 3, line 61, delete "well_known" and insert -- well known --, therefor.

In column 4, line 58, delete "he" and insert -- be --, therefor.

In column 5, line 30, delete "roll-back" and insert -- rollback --, therefor.

In column 6, line 52, delete "respectively.lines" and insert -- respectively. Lines --, therefor.

In column 7, line 24, delete "roll-back" and insert -- rollback --, therefor.

In column 7, line 25, delete "un-do" and insert -- undo --, therefor.

In column 8, line 51, delete "key_board" and insert -- keyboard --, therefor.

In column 9, line 1, delete "CD_ROM" and insert -- CD-ROM --, therefor.

In column 9, line 10, delete "product"is" and insert -- product" is --, therefor.

Signed and Sealed this
Twenty-sixth Day of May, 2015

Michelle K. Lee
*Director of the United States Patent and Trademark Office*